United States Patent
Zhang

(10) Patent No.: US 10,140,740 B2
(45) Date of Patent: Nov. 27, 2018

(54) INFORMATION PROCESSING METHOD AND ELECTRONIC APPARATUS

(71) Applicants: Lenovo (Beijing) Limited, Beijing (CN); Beijing Lenovo Software Ltd., Beijing (CN)

(72) Inventor: Bo Zhang, Beijing (CN)

(73) Assignees: Beijing Lenovo Software Ltd., Beijing (CN); Lenovo (Beijing) Limited, Beijing (CN)

( * ) Notice: Subject to any disclaimer, the term of this patent is extended or adjusted under 35 U.S.C. 154(b) by 408 days.

(21) Appl. No.: 14/461,996

(22) Filed: Aug. 18, 2014

(65) Prior Publication Data
US 2015/0243061 A1 Aug. 27, 2015

(30) Foreign Application Priority Data
Feb. 21, 2014 (CN) .......................... 2014 1 0060890

(51) Int. Cl.
*G09G 5/00* (2006.01)
*G06T 11/60* (2006.01)
(Continued)

(52) U.S. Cl.
CPC ............ *G06T 11/60* (2013.01); *G06T 11/203* (2013.01); *G09G 5/003* (2013.01); *G09G 5/18* (2013.01)

(58) Field of Classification Search
CPC ....... G06T 11/60; G06T 11/203; G09G 5/003; G09G 5/18; G06F 3/00; G06F 3/012;
(Continued)

(56) References Cited

U.S. PATENT DOCUMENTS

2001/0047626 A1* 12/2001 Ohkado .............. H04M 7/0045
49/506
2005/0262199 A1* 11/2005 Chen .................... G06Q 10/107
709/204
(Continued)

FOREIGN PATENT DOCUMENTS

CN 101076170 A 11/2007
CN 101179524 A 5/2008
(Continued)

OTHER PUBLICATIONS

"Chinese Application No. 201410060890.5, Office Action dated Apr. 8, 2016", w/ English Translation, (Apr. 8, 2016), 16 pgs.

*Primary Examiner* — Sarah Lhymn
(74) *Attorney, Agent, or Firm* — Schwegman Lundberg & Woessner, P.A.

(57) ABSTRACT

The present disclosure provides an information processing method for use in an electronic apparatus having a display unit, wherein the electronic apparatus is capable of displaying data in a first display mode and is further capable of, when obtaining a first data while operating in the first display mode, updating display content on a display interface of the display unit and displaying the first data. The method comprises: obtaining the first data when the electronic apparatus is in the first display mode; detecting a first operation and determining whether the first operation satisfies a first preset condition to obtain a first determination result; and displaying the first data in a second display mode different from the first display mode if the first determination result is YES. The present disclosure also provides an electronic apparatus.

20 Claims, 3 Drawing Sheets

(51) Int. Cl.
*G09G 5/18* (2006.01)
*G06T 11/20* (2006.01)

(58) Field of Classification Search
CPC ... G06F 3/017; G06F 3/0484; H04L 12/1813; H04L 12/581
USPC ....... 345/481, 467, 510, 545, 548, 556, 557, 345/581
See application file for complete search history.

(56) References Cited

U.S. PATENT DOCUMENTS

| | | | |
|---|---|---|---|
| 2006/0149818 A1* | 7/2006 | Odell | G06Q 10/107 709/206 |
| 2008/0016544 A1 | 1/2008 | Lee et al. | |
| 2009/0313334 A1* | 12/2009 | Seacat | G06F 15/16 709/206 |
| 2013/0011114 A1* | 1/2013 | Tashiro | G11B 27/105 386/230 |
| 2016/0195925 A1* | 7/2016 | Nguyen | G06F 3/0487 345/156 |

FOREIGN PATENT DOCUMENTS

| | | | |
|---|---|---|---|
| CN | 103297837 A | * | 9/2013 |
| CN | 103297837 A | | 9/2013 |

\* cited by examiner

SELECT
TOPIC 1

201

TOPIC1: WINTER OLYMPICS

TOPIC 2: FLOWERS

TOPIC 3: TRAVEL

USERA: 2014-2-19 19:00:01
Did you watch the Winter Olympics?

USERB: 2014-2-19 19:01:05
　　Of course! I lover figure skating!hehe!!

USERC: 2014-2-19 19:01:15
　　I didn't. Too busy. I love figure skating, too!

USERB: 2014-2-19 19:02:13
　　The female figure skating game is amazing...

USERA: 2014-2-19 19:03:21
　　Which player do you support?

USERB: 2014-2-19 19:05:02
　　Of course the Chinese players!

USERC: 2014-2-19 19:05:35
　　China's the BEST！！！

202

USERA: 2014-2-19 20:02:00
　　What country do you want to visit?
USERB: 2014-2-19 20:02:41
　　Japan. I want to spend some days in Tokyo.

USERA: 2014-2-19 19:00:01
Did you watch the Winter Olympics?

USERB: 2014-2-19 19:01:05
　　Of course! I lover figure skating!hehe!!

USERC: 2014-2-19 19:01:15
　　I didn't. Too busy. I love figure skating, too!

USERB: 2014-2-19 19:02:13
　　The female figure skating game is amazing...

USERA: 2014-2-19 19:03:21
　　Which player do you support?

USERB: 2014-2-19 19:05:02
　　Of course the Chinese players!

USERC: 2014-2-19 19:05:35
　　China's the BEST！！！

205

USERA: 2014-2-19 20:02:00
　　What country do you want to visit?
USERB: 2014-2-19 20:02:41
　　Japan. I want to spend some days in Tokyo.

FIG. 2C

INFORMATION PROCESSING METHOD AND ELECTRONIC APPARATUS

CROSS-REFERENCE TO RELATED APPLICATION(S)

This application claims priority to the Chinese Application No. 201410060890.5, filed on Feb. 21, 2014, which is incorporated herein by reference in its entirety.

TECHNICAL FIELD

The present disclosure relates to electronic technology, and particularly to an information processing method and an electronic apparatus.

BACKGROUND

With the rapid development of electronic apparatus, many electronic apparatus are equipped with display units capable of displaying various data information, such as text information, audio information, and video information. These data information may be stored in the electronic apparatus or obtained from another electronic apparatus. The information display function of the electronic apparatus provides a way for a user to obtain the information visually.

For example, in daily life, people may establish conversion groups via mobile QQ or WeChat (a group chatting software similar to MSN), etc. Each member of one group may read messages in a message display region and participate chat by inputting comments in a message input region about topics in which he/she is interested. In this way, the people can communicate and have fun by group chatting even though they may be dispersed in different locations. For another example, debugging information may be displayed on a display interface when the electronic apparatus is subjected to debugging so that the user may be informed of current debugging state of the electronic apparatus.

SUMMARY

An aspect of the present disclosure provides an information processing method for use in a first electronic apparatus having a display unit, wherein the first electronic apparatus is capable of displaying data in a first display mode and is further capable of, when obtaining a first data while operating in the first display mode, updating display content on a display interface of the display unit and displaying the first data, the method comprising:

obtaining the first data when the first electronic apparatus is in the first display mode;

detecting a first operation and determining whether the first operation satisfies a first preset condition to obtain a first determination result; and displaying the first data in a second display mode different from the first display mode if the first determination result is YES.

Optionally, the detecting the first operation and determining whether the first operation satisfies the first preset condition to obtain the first determination result may comprise:

determining whether the first data is local data stored in the first electronic apparatus to obtain a second determination result, and/or determining whether the first data is interaction data generated from data interaction between the first electronic apparatus and a second electronic apparatus other than the first electronic apparatus to obtain a third determination result;

detecting the first operation if the second determination result or the third determination result is YES; and determining whether the first operation satisfies the first preset condition to obtain the first determination result.

Optionally, the determining whether the first operation satisfies the first preset condition to obtain the first determination result may comprise:

determining whether the first operation is a stop operation by the user to stop viewing the display content on the display interface to obtain the first determination result.

Optionally, the displaying the first data in the second display mode different from the first display mode if the first determination result is YES may comprise:

displaying the first data on the display interface and stopping update of the display content on the display interface when the display interface is in an ON state if the first determination result is YES, wherein the first electronic apparatus stops update of the display content on the display interface if the first electronic apparatus is in the second display mode.

Optionally, the method may further comprise, after displaying the first data in the second display mode different from the first display mode:

storing second data other than the first data when the first electronic apparatus obtains the second data to display the second data on the display interface when the user requests.

Optionally, the determining whether the first operation satisfies the first preset condition to obtain the first determination result may comprise:

determining whether the first operation is a review operation by the user to review the display content on the display interface after the user has stopped viewing the display content for a time period to obtain the first determination result.

Optionally, the displaying the first data in the second display mode different from the first display mode if the first determination result is YES may comprise:

stopping update of the display content on the display interface if the first determination result is YES;

obtaining a time point when the user stops viewing the display content on the display interface as a first time point and obtaining a time point of detecting the first operation as a second time point;

determining whether the second time point is later than the first time point to obtain the second determination result;

obtaining a first update data amount with which the display interface updates the display content from the first time point to the second time point and determining whether the first update data amount is less than a preset display data amount on the display interface to obtain a fourth determination result, if the second determination result is YES; and displaying the first data on the display interface if the fourth determination result is YES.

Optionally, the displaying the first data in the second display mode different from the first display mode if the first determination result is YES may comprise:

stopping update of the display content on the display interface if the first determination result is YES;

detecting a second operation to display the first data on the display interface; and performing the second operation to display the first data on the display interface.

Optionally, the method may further comprise, after the displaying the first data in the second display mode different from the first display mode:

obtaining M content topics contained in all of the data displayed on the display interface within the time period and obtaining a starting position of respective data corresponding to each content topic in the M content topics; and splitting the display interface into a first display region and a second display region other than the first display region, wherein the first display region is configured for displaying the M content topics and the second display region is configured for displaying a first data corresponding to the first content topic when a third operation by the user on the first content topic in the M content topics is detected, the first data being included in all of the data.

Optionally, the method may further comprise, after the displaying the first data in the second display mode different from the first display mode:

obtaining a third data different from the first data; and splitting the display interface into a third display region for displaying the first data and a fourth display region for displaying the third data.

Optionally, the method may further comprise, after the displaying the first data in the second display mode different from the first display mode:

detecting a fourth operation and determining whether the fourth operation satisfies a second preset condition to obtain a fifth determination result; and displaying the data in the first display mode if the fifth determination result is YES.

Another aspect of the present disclosure provides an electronic apparatus having a display unit and capable of displaying data in a first display mode, wherein the electronic apparatus is further capable of, when obtaining a first data while operating in the first display mode, updating display content on a display interface of the display unit and displaying the first data, the electronic apparatus comprising:

a first obtaining unit configured for obtaining the first data when the electronic apparatus is in the first display mode;

a second obtaining unit configured for detecting a first operation and determining whether the first operation satisfies a first preset condition to obtain a first determination result; and a first display unit configured for displaying the first data in a second display mode different from the first display mode if the first determination result is YES.

Optionally, the second obtaining unit may comprise:

a first determining sub-unit configured for determining whether the first data is local data stored in the electronic apparatus to obtain a second determination result, and/or a third determining sub-unit configured for determining whether the first data is interaction data generated from data interaction between the electronic apparatus and a second electronic apparatus other than the electronic apparatus to obtain a third determination result;

a first obtaining sub-unit configured for detecting the first operation if the second determination result or the third determination result is YES; and a second determining sub-unit configured for determining whether the first operation satisfies the first preset condition to obtain the first determination result.

Optionally, the determining whether the first operation satisfies the first preset condition to obtain the first determination result may comprise:

determining whether the first operation is a stop operation by the user to stop viewing the display content on the display interface to obtain the first determination result.

Optionally, the first display unit may be further configured for:

displaying the first data on the display interface and stopping update of the display content on the display interface when the display interface is in an ON state if the first determination result is YES, wherein the electronic apparatus stops update of the display content on the display interface if the electronic apparatus is in the second display mode.

Optionally, the electronic apparatus may further comprise a first storage unit configured for, after displaying the first data by the first display unit in the second display mode different from the first display mode, storing second data other than the first data when the first electronic apparatus obtains the second data to display the second data on the display interface when the user requests.

Optionally, the determining whether the first operation satisfies the first preset condition to obtain the first determination result may comprise:

determining whether the first operation is a review operation by the user to review the display content on the display interface after the user has stopped viewing the display content for a time period to obtain the first determination result.

Optionally, the first display unit may comprise:

a first processing sub-unit configured for stopping update of the display content on the display interface if the first determination result is YES;

a third obtaining sub-unit configured for obtaining a time point when the user stops viewing the display content on the display interface as a first time point and obtaining a time point of detecting the first operation as a second time point, while the first processing sub-unit stops the update of the display content on the display interface;

a fifth determining sub-unit configured for determining whether the second time point is later than the first time point to obtain the second determination result;

a fourth obtaining sub-unit configured for obtaining a first update data amount with which the display interface updates the display content from the first time point to the second time point and determining whether the first update data amount is less than a preset display data amount on the display interface to obtain a fourth determination result, if the second determination result is YES; and a first display sub-unit configured for displaying the first data on the display interface if the fourth determination result is YES.

Optionally, the first display unit may comprise:

a second processing sub-unit configured for stopping update of the display content on the display interface if the first determination result is YES;

a fifth obtaining sub-unit configured for detecting a second operation to display the first data on the display interface; and a second display sub-unit configured for performing the second operation to display the first data on the display interface.

Optionally, the electronic apparatus may further comprise:

a third obtaining unit configured for, after the displaying by the first display unit the first data in the second display mode different from the first display mode, obtaining M content topics contained in all of the data displayed on the display interface within the time period and obtaining a starting position of respective data corresponding to each content topic in the M content topics; and a first processing unit configured for splitting the display interface into a first display region and a second display region other than the first display region, wherein the first display region is configured for displaying the M content topics and the second display region is configured for displaying a first data corresponding to the first content topic when a third operation by the user on the first content topic in the M content topics is detected, the first data being included in all of the data.

Optionally, the electronic apparatus may further comprise:

a fourth obtaining unit configured for, after the displaying by the first display unit the first data in the second display mode different from the first display mode, obtaining a third data different from the first data; and a second processing unit configured for splitting the display interface into a third display region for displaying the first data and a fourth display region for displaying the third data.

Optionally, the electronic apparatus may further comprise:

a fifth obtaining unit configured for, after the displaying by the first display unit the first data in the second display mode different from the first display mode, detecting a fourth operation and determining whether the fourth operation satisfies a second preset condition to obtain a fifth determination result; and a second display unit configured for displaying the data in the first display mode if the fifth determination result is YES.

Other features and advantages of the present disclosure will be illustrated in the following description or be understood by implementing the present disclosure. Objects and advantages of the present disclosure can be implemented and achieved by embodiments described in the specification, claims, and accompanying drawings.

BRIEF DESCRIPTION OF THE DRAWINGS

Embodiments of the present disclosure will be described in detail with reference to the accompanying drawings. It should be noted that the drawings only show examples of the embodiments of the present disclosure. Those skilled in the art will readily be able to make various modifications to these drawings within the scope of the present disclosure.

FIGS. 2A-2C schematically show an display interface that is split according to embodiments of the present disclosure.

DETAILED DESCRIPTION

Figure 1:
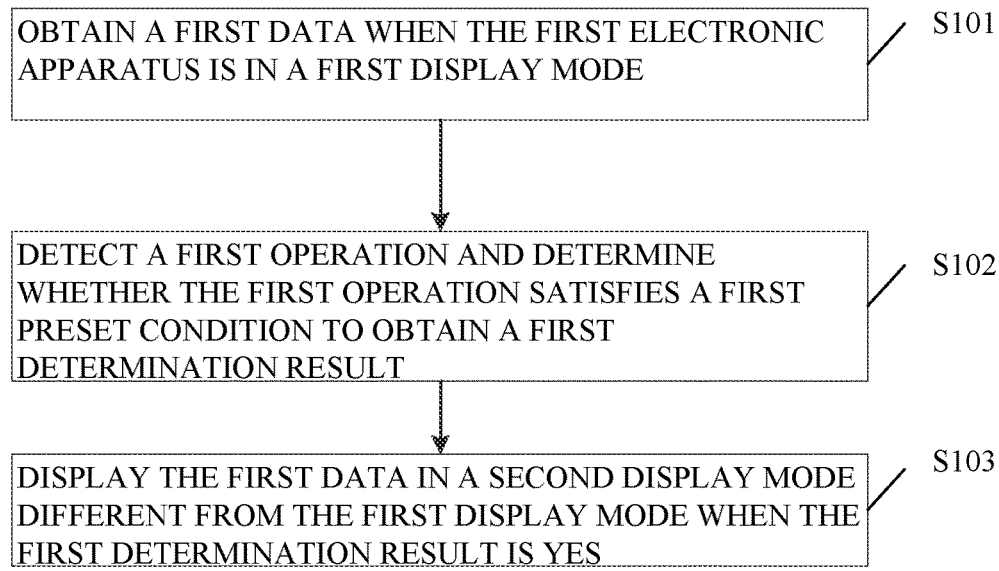
FIG. 1 schematically shows a flow chart of an information processing method according to an embodiment of the present disclosure.

One or more embodiments according to the present disclosure may be used to address the following problems. Currently, a display interface may have a limited display area so that current display data on the display interface will be refreshed automatically if data amount to be displayed is larger than what can be displayed simultaneously on the display interface. This makes it difficult to provide a user the display data that he/she needs according to a current state of the user. According to one or more of the present disclosure, when a large amount of data is displayed continuously on the display interface, a display mode may be determined according to whether the user's attention is on the display interface. That is, the display data is refreshed normally if the user's attention is on the display interface while the refresh stops and the data is displayed according to the user's review request if the user's attention is not on the display interface. This can improve the user's experience greatly. However, it should be noted that one or more embodiments of the present disclosure may not resolve any problem and/or achieve any effect as described above.

An aspect of the present disclosure provides an information processing method for use in a first electronic apparatus having a display unit, wherein the first electronic apparatus is capable of displaying data in a first display mode and is further capable of, when obtaining a first data while operating in the first display mode, updating display content on a display interface of the display unit and displaying the first data, the method comprising: obtaining the first data when the first electronic apparatus is in the first display mode; detecting a first operation and determining whether the first operation satisfies a first preset condition to obtain a first determination result; and displaying the first data in a second display mode different from the first display mode if the first determination result is YES.

In this embodiment, the first electronic apparatus has two display modes including the first display mode and the second display mode. The first electronic apparatus updates the display content on the display interface and display the first data when the first electronic apparatus obtains the first data while operating in the first display mode. In this embodiment, the first electronic apparatus uses the first operation by the user to the first electronic apparatus as a determination condition. That is, the first operation by the user to the display interface of the first electronic apparatus is detected when the first electronic apparatus obtains the first data. Then it is determined whether the first operation satisfies the preset condition. The data is displayed in the second display mode if the determination result is YES. One or more embodiment of the present disclosure may be used to address the following problems. Currently, a display interface may have a limited display area so that current display data on the display interface will be refreshed automatically if data amount to be displayed is larger than what can be displayed simultaneously on the display interface. This makes it difficult to provide a user the display data that he/she needs according to a current state of the user. According to one or more of the present disclosure, when a large amount of data is displayed continuously on the display interface, the display mode may be determined according to whether the user's attention is on the display interface. That is, the display data is refreshed normally if the user's attention is on the display interface while the refresh stops and the data is displayed according to the user's review requirement if the user's attention is not on the display interface. This can improve the user's experience greatly.

Next, the present disclosure will be described in detail in connection with specific embodiments with reference to the drawings. It should be noted that the embodiments and features thereof are only exemplary rather than constituting any limitation to the present disclosure. The features in various embodiments may be combined with each other where possible and appropriate.

As shown in FIG. 1, an embodiment of the present disclosure provides an information processing method for use in a first electronic apparatus having a display unit. The first electronic apparatus may be a notebook computer, a smart phone, or a tablet computer, etc. The first electronic apparatus is capable of displaying data in a first display mode and is further capable of, when obtaining a first data while operating in the first display mode, updating display content on a display interface of the display unit and displaying the first data, the method comprising:

S101: obtaining the first data when the first electronic apparatus is in the first display mode;

S102: detecting a first operation and determining whether the first operation satisfies a first preset condition to obtain a first determination result; and S103: displaying the first data in a second display mode different from the first display mode if the first determination result is YES.

In practice, there may be the following two cases. In the first case, the user's attention keeps focusing on the display content on the display interface of the electronic apparatus and thus the user will not miss any display content on the display interface. In this case, the electronic apparatus may simplify display the data in the first display mode. In the second case, the user's attention moves away from the data displayed on the display interface and thus the user will miss certain display content. In this case, the electronic apparatus will display the data in the second mode.

Specifically, when a plurality of users are chatting via a group chat software, new chat messages are generated continuously. The messages displayed in a message display region is refreshed automatically when the amount of the messages exceeds a maximum message amount that can be displayed in the message display region of the group chat software. As a result, previous messages are replaced by new messages, which are then displayed in the message display region. In an embodiment of the present disclosure, the first electronic apparatus detects a current operation, i.e., the first operation, of the user whenever the first electronic apparatus receives a new message. For example, the first electronic apparatus determines whether the user's attention keeps focusing on the group chat. If the first operation satisfies the preset condition, e.g., the user's attention moves away from the group chat, the first electronic apparatus stops refreshing the messages automatically but display the messages in the second display mode.

In practice, it may be advantageous that local data of the first electronic apparatus can be displayed in the second display mode when the user's operation satisfies the preset condition while the local data is being displayed continuously on the first electronic apparatus. In such a case, the detecting the first operation and determining whether the first operation satisfies the first preset condition to obtain the first determination result may comprise:

determining whether the first data is local data stored in the first electronic apparatus to obtain a second determination result;

detecting the first operation if the second determination result is YES; and determining whether the first operation satisfies the first preset condition to obtain the first determination result.

In practice, it may be advantageous that interaction data between the first electronic apparatus and a second electronic apparatus can be displayed in the second display mode when the user's operation satisfies the preset condition while the first electronic apparatus interacts with the second electronic apparatus. In such a case, the detecting the first operation and determining whether the first operation satisfies the first preset condition to obtain the first determination result may comprise:

determining whether the first data is interaction data generated from data interaction between the first electronic apparatus and the second electronic apparatus other than the first electronic apparatus to obtain a third determination result;

detecting the first operation if the third determination result is YES; and determining whether the first operation satisfies the first preset condition to obtain the first determination result.

Furthermore, in order to display the data in the second display mode in response to the user stopping viewing the display content on the display interface, the determining whether the first operation satisfies the first preset condition to obtain the first determination result may comprise:

determining whether the first operation is a stop operation by the user to stop viewing the display content on the display interface to obtain the first determination result.

Furthermore, in order to enable the user to view the content generated during a time period when the user's attention moves away, the displaying the first data in the second display mode different from the first display mode if the first determination result is YES may comprise:

displaying the first data on the display interface and stopping update of the display content on the display interface when the display interface is in an ON state if the first determination result is YES, wherein the first electronic apparatus stops update of the display content on the display interface if the first electronic apparatus is in the second display mode.

Furthermore, in order to enable the first electronic apparatus to obtain new data during the time period when the user's attention moves away so that the new data can be displayed when necessary, the method may further comprise, after displaying the first data in the second display mode different from the first display mode:

storing second data other than the first data when the first electronic apparatus obtains the second data to display the second data on the display interface when the user requests.

In practice, in order to display the data in the second display mode when the user reviews the display content on the display interface after the user has stopped viewing the display content on the display interface for a time period, the determining whether the first operation satisfies the first preset condition to obtain the first determination result may comprise:

determining whether the first operation is a review operation by the user to review the display content on the display interface after the user has stopped viewing the display content for a time period to obtain the first determination result.

Furthermore, the displaying the first data in the second display mode different from the first display mode if the first determination result is YES may comprise:

stopping update of the display content on the display interface if the first determination result is YES;

obtaining a time point when the user stops viewing the display content on the display interface as a first time point and obtaining a time point of detecting the first operation as a second time point;

determining whether the second time point is later than the first time point to obtain the second determination result;

obtaining a first update data amount with which the display interface updates the display content from the first time point to the second time point and determining whether the first update data amount is less than a preset display data amount on the display interface to obtain a fourth determination result, if the second determination result is YES; and displaying the first data on the display interface if the fourth determination result is YES.

According to this embodiment, the first electronic apparatus can stop refreshing the display content automatically when the user's attention moves back to the display content on the display interface. The first electronic apparatus determines whether the current obtained data, i.e., the first data, should be displayed according to the length of the time period when the user's attention is away and the display capacity of the display interface. If the time period when the user's attention is away is short and the current obtained does not cover the whole display interface, the current obtained data is displayed on the display interface.

In practice, in order to display the current obtained data according to the user's request if the first electronic apparatus does not refresh the display content on the display interface when the user's attention move back to the display interface, the displaying the first data in the second display mode different from the first display mode if the first determination result is YES may comprise:

stopping update of the display content on the display interface if the first determination result is YES;

detecting a second operation to display the first data on the display interface; and performing the second operation to display the first data on the display interface.

Furthermore, in order to classify all of the data obtained during the time period when the user's attention is away according to the topics thereof so that the user may have a quick understanding about what he/she has missed, the method may further comprise, after the displaying the first data in the second display mode different from the first display mode:

obtaining M content topics contained in all of the data displayed on the display interface within the time period and obtaining a starting position of respective data corresponding to each content topic in the M content topics; and splitting the display interface into a first display region and a second display region other than the first display region, wherein the first display region is configured for displaying the M content topics and the second display region is configured for displaying a first data corresponding to the first content topic when a third operation by the user on the first content topic in the M content topics is detected, the first data being included in all of the data.

Furthermore, in order to enable the user to view historical data and real-time data on the same display interface, the method may further comprise, after the displaying the first data in the second display mode different from the first display mode:

obtaining a third data different from the first data; and splitting the display interface into a third display region for displaying the first data and a fourth display region for displaying the third data.

In this embodiment, the first data is the historical data with respect to the third data. The display interface is split into at least two display regions for displaying the historical data and the real-time data, respectively.

In practice, in order to switch from the second display mode to the first display mode, the method may further comprise, after the displaying the first data in the second display mode different from the first display mode:

detecting a fourth operation and determining whether the fourth operation satisfies a second preset condition to obtain a fifth determination result; and displaying the data in the first display mode if the fifth determination result is YES.

Next, one embodiment will be described with reference to an example that the first data is local data of the first electronic apparatus.

For example, when a user is debugging using the first electronic apparatus, such as a computer, new debugging data are generated on a debugging interface continuously. The debugging data is displayed on the display interface in the first display mode and is refreshed continuously. The first electronic apparatus detects whether the user's attention is on the debugging interface by e.g., detecting whether the user is clicking on the debugging interface or detecting whether the user's eyes are focusing on the display interface through iris detection, whenever the first electronic apparatus obtains new debugging data, i.e., the first data. There may be the following two aspects.

(1) When the first operation is that the user stops viewing the display content on the display interface by, e.g., detecting the user's eyes move away from the display interface through the iris detection, there may be the following three cases:

Case 1: The first data is displayed on the display interface and the display data on the display interface is not updated any more while the display interface is in an ON state. The first electronic apparatus continues to obtain and cache further new data while the display data on the display interface is no longer updated. In this way, the first electronic apparatus can display the cached new data on the display interface when the user requests to view the new data.

Case 2: The amount of the first data is obtained while the display interface is in the ON state and the first electronic apparatus determines whether the display interface will be refreshed if the first data is displayed. If the determines result is YES, the update of the display data on the display interface is stopped and the first data is not displayed until the user requests to view the first data. On the other hand, the first data is displayed if the determination result is NO.

Case 3: The first data is cached without being displayed while the display interface is in the ON state. The first data is displayed on the display interface when the user requests to view the first data.

(2) When it is detected that the first operation is the user reviewing the display content on the display interface after the user has stopped viewing the display content for a time period, e.g., by sensing the user's eyes move back to the display interface through iris detection or by detecting the user clicking the display interface, it can be considered that the display interface displays the data in the first display mode before the first operation is detected. The subsequent operation may include the following cases:

Case 1: The first electronic apparatus stops updating the display content on the display interface. Meanwhile, the first electronic apparatus obtains a first time point when the user's attention moves away from the display interface and a second time point when the first operation is detected. The first electronic apparatus then determines a data amount, i.e., a first update data amount, that has been displayed on the display interface during the period from the first time point to the second time point. It is determined whether the first update data amount is less than a preset display data amount of the whole display interface, e.g., whether the data display area occupies 80% of the whole display interface. The user may have missed many display contents. The first electronic apparatus detects the time point when the user's attention moves back to the display interface and determines whether the data displayed when the user's attention moves away is still on the display interface by determining whether the content displayed on the display interface during the time period from the attention-away time point to the attention-back time point is larger than a preset value. The obtained first data is displayed normally if the determination result is YES. The update of the display content on the display interface is stopped and the first data is cached for display when requested by the user if the determination result is NO.

Case 2: The first electronic apparatus stops update of the display content on the display interface and caches the first data for display when requested by the user, e.g., when the user's clicks a "view historical records" button on the display interface.

Furthermore, for the two cases under aspect (2), there may be the following embodiments. According to these embodiments, the display data generated while the user's attention is away can be displayed so that the user can view the data continuously even in case where the user's attention is away from the display interface for a long period.

The first electronic apparatus may record a time point when the user's attention moves away from the display interface and the display data on the display interface at this time point. The user may miss many display contents during the period when his/her attention is away. The first electronic apparatus detects a time point when the user's attention moves back and displays the data from the time point when the user's attention moves away.

Specifically, for example, the user's attention may move away from the display interface at 00:13:50 when an audio player on the first electronic apparatus is playing an audio. The audio is played continuously until the user's attention is detected to move back to the display interface at 00:40:30. The audio player then turn back to play the audio from the time point 00:13:50.

Next, one embodiment will be described with reference to an example that the first data is the interaction data between the first electronic apparatus and the second electronic apparatus.

For example, when a plurality of users are chatting using a group chat software, there may be the following cases.

Case 1: The first electronic apparatus detects the user's attention moves away when other group members are producing messages actively and the display interface is refreshing the message display quickly.

(1) The first electronic apparatus may stop refreshing the display interface. The display interface stops at the display page when the user's attention moves away. Meanwhile, the first electronic apparatus continues to receive and cache chat messages. The first electronic apparatus continues to display the messages from this display page automatically or according to the user's request when it detects the user's attention moves back.

(2) The first electronic apparatus may continues to display the messages in the first display mode and returns to the page displayed when the user's attention moves away to display the subsequent messages automatically or according to the user's request, when it detects the user's attention moves back to the display interface.

Case 2: The first electronic apparatus detects the user's attention moves away and then moves back after a time period while other group members are producing messages actively and the display interface is refreshing the message display quickly. During the time period when the user's attention is away, the display interface continues to display the message in the first display mode if the display interface remains in an ON state. Otherwise, the message record on the display interface remains as when the display interface is turned off by the user and subsequent messages are stored in the first electronic apparatus as message records if the display interface is turned off by the user and turned on again later.

(1) The first electronic apparatus may control the display interface to stop refreshing the messages and obtain a first update data amount of the display interface during the time period when the user's attention is away if the display interface remains in the ON state. The first electronic apparatus determines whether the first update data amount is less than a preset display amount, i.e., the maximum data display capacity of the display interface. The obtained new data, i.e., the first data, is displayed on the display interface if the determination result is YES. Otherwise, the first data is displayed according to the user's request if the first update data amount is larger than or equal to the preset display amount.

On the other hand, the first electronic apparatus may determine whether the display data when the user's attention moves away is still on the display interface. The display interface turns back to display the message when the user's attention moves away automatically or according to the user's request, e.g., the user's manual operation, if the determination result is NO.

(2) The first electronic apparatus may control the display interface to stop refreshing the messages and not to display the newly-obtained first data if the display interface remains in the ON state. The first data may be displayed according to the user's request.

This embodiment is an extension of the foregoing two embodiments.

Figure 2A:
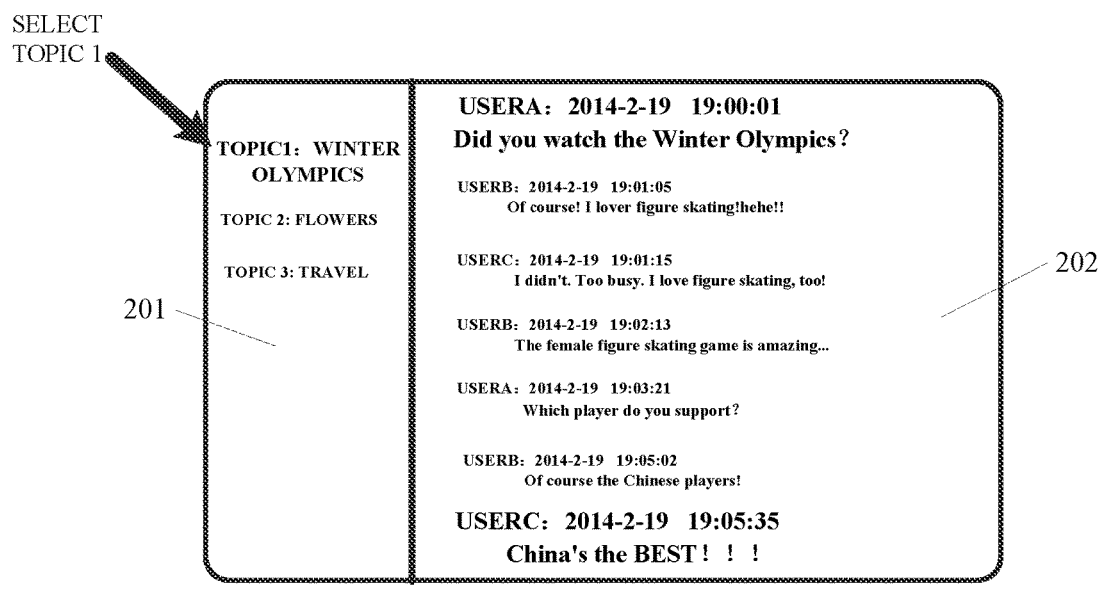

The first electronic apparatus may obtain all of the data during a time period from the time point when the user's attention moves away to the time point when the user's attention moves back, no matter what state the display interface is currently in. For example, the display interface may be displaying a page that is displayed when the user's attention moves away or a real-time message page, etc. The user's attention can be detected to move back by, e.g., clicking operation on the display interface or iris detection indicating that the user's eyes are focusing on the display interface. The data may have been displayed on the display interface or have been cached in the first electronic apparatus without being displayed. The first electronic apparatus may also obtain the content topics of the data, e.g., "Winter Olympics," "flowers," or "travel," etc. The first electronic apparatus may further obtain a starting point for each content topic and highlight the starting point. The user may select a content topic in which he/she is interested to view corresponding messages. As shown in FIG. 2A, the display interface may be split into a first display region 201 and a second display region 202. A plurality of content topics may be displayed in the first display region 201, such as "Topic 1 Winter Olympics," "Topic 2 Flowers," and "Topic 3 Travel," etc. Content data is displayed in the second display region 202. Specifically, when a certain topic, e.g. "Topic 1 Winter Olympics" is selected, corresponding data content will be displayed in the second display region 202. The corresponding data content may be messages from the message of user A at 19:00:01 on Feb. 19, 2014 to the message of user C at 19:05:35 on Feb. 19, 2014. The starting point and the ending point of these messages are both highlighted, e.g., in bold.

Furthermore, in order to display real-time data content, another display region may be split from the display interface. As shown in FIG. 2B, the display interface is split into the first display region 201, the second display region 202, and a further display region 203 to display the real-time data content. As shown in FIG. 2B, the display region 203 displays contents about "Topic 3 Travel."

Alternatively, the display interface may be split into two display regions including a display region 204 for displaying historical data and another display region 205 for displaying real-time data, as shown in FIG. 2C. In this way, the historical data and the real-time data can be displayed simultaneously.

Furthermore, if the user performs an pull-down or slip operation to view the data in a downward direction while he/she is viewing the historical data, the display interface changes to the first display mode as the user gets to the bottom of the historical data. The display interface then changes to containing only one display region for the real-time messages.

Figure 3:
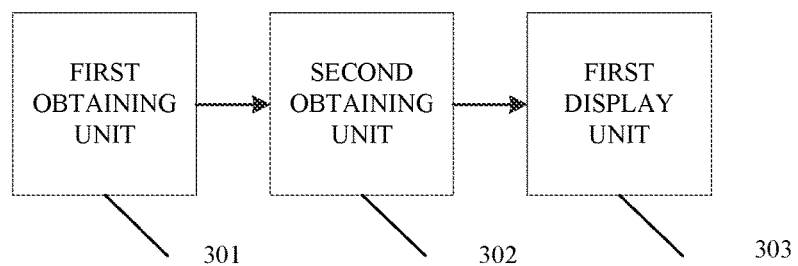
FIG. 3 schematically shows a block diagram of an electronic apparatus according to an embodiment of the present disclosure.

The present disclosure further discloses an electronic apparatus. As shown in FIG. 3, the electronic apparatus has a display unit and is capable of displaying data in a first display mode. The electronic apparatus is further capable of, when obtaining a first data while operating in the first display mode, updating display content on a display interface of the display unit and displaying the first data, the electronic apparatus comprising:

a first obtaining unit 301 configured for obtaining the first data when the electronic apparatus is in the first display mode;

a second obtaining unit 302 configured for detecting a first operation and determining whether the first operation satisfies a first preset condition to obtain a first determination result; and a first display unit 303 configured for displaying the first data in a second display mode different from the first display mode if the first determination result is YES.

In practice, it may be advantageous that local data of the electronic apparatus can be displayed in the second display mode when the user's operation satisfies the preset condition while the local data is being displayed continuously on the electronic apparatus. In such a case, the second obtaining unit may comprise:

a first determining sub-unit configured for determining whether the first data is local data stored in the electronic apparatus to obtain a second determination result;

a first obtaining sub-unit configured for detecting the first operation if the second determination result is YES; and a second determining sub-unit configured for determining whether the first operation satisfies the first preset condition to obtain the first determination result.

In practice, it may be advantageous that interaction data between the electronic apparatus and a second electronic apparatus can be displayed in the second display mode when the user's operation satisfies the preset condition while the electronic apparatus interacts with the second electronic apparatus. In such a case, the second obtaining unit may comprise:

a third determining sub-unit configured for determining whether the first data is interaction data generated from data interaction between the electronic apparatus and a second electronic apparatus other than the electronic apparatus to obtain a third determination result;

a first obtaining sub-unit configured for detecting the first operation if the third determination result is YES; and a second determining sub-unit configured for determining whether the first operation satisfies the first preset condition to obtain the first determination result.

Furthermore, in order to display the data in the second display mode in response to the user stopping viewing the display content on the display interface, the determining whether the first operation satisfies the first preset condition to obtain the first determination result may comprise:

determining whether the first operation is a stop operation by the user to stop viewing the display content on the display interface to obtain the first determination result.

Furthermore, in order to enable the user to view the content generated during a time period when the user's attention moves away, the first display unit 303 may be further configured for:

displaying the first data on the display interface and stopping update of the display content on the display interface when the display interface is in an ON state if the first determination result is YES, wherein the electronic apparatus stops update of the display content on the display interface if the electronic apparatus is in the second display mode.

Furthermore, in order to enable the electronic apparatus to obtain new data during the time period when the user's attention moves away so that the new data can be displayed when necessary, the electronic apparatus may further comprise a first storage unit configured for, after displaying the first data by the first display unit in the second display mode different from the first display mode, storing second data other than the first data when the electronic apparatus obtains the second data to display the second data on the display interface when the user requests.

In practice, in order to display the data in the second display mode when the user reviews the display content on the display interface after the user has stopped viewing the display content on the display interface for a time period, the determining whether the first operation satisfies the first preset condition to obtain the first determination result may comprise:

determining whether the first operation is a review operation by the user to review the display content on the display interface after the user has stopped viewing the display content for a time period to obtain the first determination result.

Furthermore, the first display unit may comprise:

a first processing sub-unit configured for stopping update of the display content on the display interface if the first determination result is YES;

a third obtaining sub-unit configured for obtaining a time point when the user stops viewing the display content on the display interface as a first time point and obtaining a time point of detecting the first operation as a second time point, while the first processing sub-unit stops the update of the display content on the display interface;

a fifth determining sub-unit configured for determining whether the second time point is later than the first time point to obtain the second determination result;

a fourth obtaining sub-unit configured for obtaining a first update data amount with which the display interface updates the display content from the first time point to the second time point and determining whether the first update data amount is less than a preset display data amount on the display interface to obtain a fourth determination result, if the second determination result is YES; and a first display sub-unit configured for displaying the first data on the display interface if the fourth determination result is YES.

According to this embodiment, the electronic apparatus can stop refreshing the display content automatically when the user's attention moves back to the display content on the display interface. The electronic apparatus determines whether the current obtained data, i.e., the first data, should be displayed according to the length of the time period when the user's attention is away and the display capacity of the display interface. If the time period when the user's attention is away is short and the current obtained does not cover the whole display interface, the current obtained data is displayed on the display interface.

In practice, in order to display the current obtained data according to the user's request if the electronic apparatus does not refresh the display content on the display interface when the user's attention move back to the display interface, the first display unit may comprise:

a second processing sub-unit configured for stopping update of the display content on the display interface if the first determination result is YES;

a fifth obtaining sub-unit configured for detecting a second operation to display the first data on the display interface; and a second display sub-unit configured for performing the second operation to display the first data on the display interface.

Furthermore, in order to classify all of the data obtained during the time period when the user's attention is away according to the topics thereof so that the user may have a quick understanding about what he/she has missed, the electronic apparatus may further comprise:

a third obtaining unit configured for, after the displaying by the first display unit the first data in the second display mode different from the first display mode, obtaining M content topics contained in all of the data displayed on the display interface within the time period and obtaining a starting position of respective data corresponding to each content topic in the M content topics; and a first processing unit configured for splitting the display interface into a first display region and a second display region other than the first display region, wherein the first display region is configured for displaying the M content topics and the second display region is configured for displaying a first data corresponding to the first content topic when a third operation by the user on the first content topic in the M content topics is detected, the first data being included in all of the data.

Furthermore, in order to enable the user to view historical data and real-time data on the same display interface, the electronic apparatus may further comprise:

a fourth obtaining unit configured for, after the displaying by the first display unit the first data in the second display mode different from the first display mode, obtaining a third data different from the first data; and a second processing unit configured for splitting the display interface into a third display region for displaying the first data and a fourth display region for displaying the third data.

In practice, in order to switch from the second display mode to the first display mode, the electronic apparatus may further comprise:

a fifth obtaining unit configured for, after the displaying by the first display unit the first data in the second display mode different from the first display mode, detecting a fourth operation and determining whether the fourth operation satisfies a second preset condition to obtain a fifth determination result; and a second display unit configured for displaying the data in the first display mode if the fifth determination result is YES.

The foregoing electronic apparatus may be used to implement the information processing method of the present disclosure. Therefore, the operation details of the electronic apparatus are omitted.

It should be noted that the embodiment of the present disclosure may be implemented as method, system, or computer program product. Thus, the present disclosure can be implemented in pure hardware, pure software, or combination of hardware and software. Also, the present disclosure may be implemented in a computer program product embodied on one or more computer-readable storage medium, including but not limited to disk memory, CD-ROM, or optical memory, etc., containing computer-executable program codes.

The present disclosure has be described with reference to flow chart and/or block diagram of the methods, apparatus (or system), or computer program products. It should be noted that each flow and/or block in the flow chart and/or block diagram and any combination of the flow and/or block in the flow chart and/or block diagram can be implemented by computer program instructions. These computer program instructions can be provided to a general computer, a specialized computer, an embedded processing machine, or a processor of other programmable data processing apparatus to generate a machine so that a device for performing specific functions in one or more flows in the flow charts and/or one or more blocks in the block diagrams can be generated by executing the instructions by the computer or the processor of the other programmable data processing apparatus.

These computer program instructions may be stored in a computer-readable memory capable of directing the computer or another programmable data processing device to operate in a specific manner. The instructions stored in the computer-readable memory may generate a product comprising instruction means for implementing one or more flows in the flow charts and/or the functions in one or more blocks in the block diagrams.

These computer program instructions may also be loaded onto the computer or the other programmable data processing device to perform a series of operations to implement one or more flows in the flow charts and/or the functions in one or more blocks in the block diagrams.

Specifically, the computer program instructions corresponding to the information processing method of the embodiments of the present disclosure may be stored in a storage medium such as an optical disk, a hard disk, or a U disk, etc. The computer program instructions corresponding to the information processing method, when are read or executed by an electronic apparatus, cause the electronic apparatus to perform:

obtaining the first data when the first electronic apparatus is in the first display mode;

detecting a first operation and determining whether the first operation satisfies a first preset condition to obtain a first determination result; and displaying the first data in a second display mode different from the first display mode if the first determination result is YES.

Optionally, the computer program instructions corresponding to detecting the first operation and determining whether the first operation satisfies the first preset condition to obtain the first determination result, when being executed, may cause the electronic apparatus to perform:

determining whether the first data is local data stored in the first electronic apparatus to obtain a second determination result, and/or determining whether the first data is interaction data generated from data interaction between the first electronic apparatus and a second electronic apparatus other than the first electronic apparatus to obtain a third determination result;

detecting the first operation if the second determination result or the third determination result is YES; and determining whether the first operation satisfies the first preset condition to obtain the first determination result.

Optionally, the computer program instructions corresponding to the determining whether the first operation satisfies the first preset condition to obtain the first determination result, when being executed, may cause the electronic apparatus to perform:

determining whether the first operation is a stop operation by the user to stop viewing the display content on the display interface to obtain the first determination result.

Optionally, the computer program instructions corresponding to the displaying the first data in the second display mode different from the first display mode if the first determination result is YES, when being executed, may cause the electronic apparatus to perform:

displaying the first data on the display interface and stopping update of the display content on the display interface when the display interface is in an ON state if the first determination result is YES, wherein the first electronic apparatus stops update of the display content on the display interface if the first electronic apparatus is in the second display mode.

Optionally, the storage medium may store some other computer instructions, which are executed after the computer program instructions corresponding to the displaying the first data in the second display mode different from the first display mode, these computer instructions when being executed may cause the electronic apparatus to perform:

storing second data other than the first data when the first electronic apparatus obtains the second data to display the second data on the display interface when the user requests.

Optionally, the computer program instructions corresponding to the determining whether the first operation satisfies the first preset condition to obtain the first determination result, when being executed, may cause the electronic apparatus to perform:

determining whether the first operation is a review operation by the user to review the display content on the display interface after the user has stopped viewing the display content for a time period to obtain the first determination result.

Optionally, the computer program instructions corresponding to the displaying the first data in the second display mode different from the first display mode if the first determination result is YES, when being executed, may cause the electronic apparatus to perform:

stopping update of the display content on the display interface if the first determination result is YES;

obtaining a time point when the user stops viewing the display content on the display interface as a first time point and obtaining a time point of detecting the first operation as a second time point;

determining whether the second time point is later than the first time point to obtain the second determination result;

obtaining a first update data amount with which the display interface updates the display content from the first time point to the second time point and determining whether the first update data amount is less than a preset display data amount on the display interface to obtain a fourth determination result, if the second determination result is YES; and displaying the first data on the display interface if the fourth determination result is YES.

Optionally, the computer program instructions corresponding to the displaying the first data in the second display mode different from the first display mode if the first determination result is YES, when being executed, may cause the electronic apparatus to perform:

stopping update of the display content on the display interface if the first determination result is YES;

detecting a second operation to display the first data on the display interface; and performing the second operation to display the first data on the display interface.

Optionally, the storage medium may store some other computer instructions, which are executed after the computer program instructions corresponding to the displaying the first data in the second display mode different from the first display mode, these computer instructions when being executed may cause the electronic apparatus to perform:

obtaining M content topics contained in all of the data displayed on the display interface within the time period and obtaining a starting position of respective data corresponding to each content topic in the M content topics; and splitting the display interface into a first display region and a second display region other than the first display region, wherein the first display region is configured for displaying the M content topics and the second display region is configured for displaying a first data corresponding to the first content topic when a third operation by the user on the first content topic in the M content topics is detected, the first data being included in all of the data.

Optionally, the storage medium may store some other computer instructions, which are executed after the computer program instructions corresponding to the displaying the first data in the second display mode different from the first display mode, these computer instructions when being executed may cause the electronic apparatus to perform:

obtaining a third data different from the first data; and splitting the display interface into a third display region for displaying the first data and a fourth display region for displaying the third data.

Optionally, the storage medium may store some other computer instructions, which are executed after the computer program instructions corresponding to the displaying the first data in the second display mode different from the first display mode, these computer instructions when being executed may cause the electronic apparatus to perform:

detecting a fourth operation and determining whether the fourth operation satisfies a second preset condition to obtain a fifth determination result; and displaying the data in the first display mode if the fifth determination result is YES.

One or more embodiments of the present disclosure may have at least the following technical effects or advantages.

In one or more embodiments of the present disclosure, the first electronic apparatus has two display modes including the first display mode and the second display mode. The first electronic apparatus updates the display content on the display interface and display the first data when the first electronic apparatus receives the first data while operating in the first display mode. Specifically, the first electronic apparatus obtains the first data while operating in the first display mode. The first electronic apparatus detects the first operation and determines whether the first operation satisfies the first preset condition to obtain the first determination result. The first electronic apparatus displays the first data in the second display mode different from the first display mode if the first determination result is YES. Normally, the first electronic apparatus displays the data in the first display mode. The first electronic apparatus detects the first operation by the user on the display interface of the first electronic apparatus when the first electronic apparatus obtains the first data. The first electronic apparatus determines whether the first operation satisfies the preset condition and displays the data in the second display mode if the determination result is YES. One or more embodiments according to the present disclosure may be used to address the following problems. Currently, a display interface may have a limited display area so that current display data on the display interface will be refreshed automatically if data amount to be displayed is larger than what can be displayed simultaneously on the display interface. This makes it difficult to provide a user the display data that he/she needs according to a current state of the user. According to one or more of the present disclosure, when a large amount of data is displayed continuously on the display interface, a display mode may be determined according to whether the user's attention is on the display interface. That is, the display data is refreshed normally if the user's attention is on the display interface while the refresh stops and the data is displayed according to the user's review request if the user's attention is not on the display interface. This can improve the user's experience greatly.

Embodiments of the present disclosure have been described as above. However, the above description is only illustrative rather than constituting any limitation thereof. Those skilled in the art may make any modification or variation to the specific manner and details of implementation of the disclosure without departing from the spirit and scope thereof. The scope of the present disclosure is defined by the attached claims, which cover every possible modification, variation, and equivalent of the present disclosure.

I claim:

1. An information processing method for use in a first electronic apparatus having a display, wherein the first electronic apparatus is capable of displaying data in a first display mode and is further capable of, when obtaining a first data while operating in the first display mode, updating display content on a display interface of the display automatically with the first data, the method comprising:
   obtaining the first data when the first electronic apparatus is in the first display mode;
   detecting a first operation and determining whether the first operation satisfies a first preset condition to obtain a first determination result, wherein the first electronic apparatus is configured to display data in the first display mode responsive to a user's attention moving away from the display content;
   obtaining a first time point when the user stops viewing the display content on the display interface, and obtaining a second time point when detecting the user's attention moving back to the display content; and
   switching the first electronic apparatus from the first display mode to a second display mode different from the first display mode responsive to the user's attention moving back to the display content after having moved away from the display content, including stopping updating the display content on the display interface automatically when the first update data amount is more than a preset display data amount on the display interface, wherein the first update data amount with which the display interface updates includes the display content from the first time point to the second time point.

2. The method according to claim 1, wherein the detecting the first operation and determining whether the first operation satisfies the first preset condition to obtain the first determination result comprises:
   determining whether the first data is local data stored in the first electronic apparatus to obtain a second determination result, and/or determining whether the first data is interaction data generated from data interaction between the first electronic apparatus and a second electronic apparatus other than the first electronic apparatus to obtain a third determination result;
   detecting the first operation if the second determination result or the third determination result is YES; and
   determining whether the first operation satisfies the first preset condition to obtain the first determination result.

3. The method according to claim 2, wherein the determining whether the first operation satisfies the first preset condition to obtain the first determination result comprises:
   determining whether the first operation is a stop operation by the user to stop viewing the display content on the display interface to obtain the first determination result.

4. The method according to claim 3, wherein the displaying the first data in the second display mode different from the first display mode if the first determination result is YES comprises:
   displaying the first data on the display interface and stopping update of the display content on the display interface when the display interface is in an ON state if the first determination result is YES,
   wherein the first electronic apparatus stops update of the display content on the display interface if the first electronic apparatus is in the second display mode.

5. The method according to claim 2, wherein the determining whether the first operation satisfies the first preset condition to obtain the first determination result comprises:
   determining whether the first operation is a review operation by the user to review the display content on the display interface after the user has stopped viewing the display content for a time period to obtain the first determination result.

6. The method according to claim 5, wherein the displaying the first data in the second display mode different from the first display mode if the first determination result is YES comprises:
   stopping update of the display content on the display interface if the first determination result is YES;
   obtaining a time point when the user stops viewing the display content on the display interface as a first time point and obtaining a time point of detecting the first operation as a second time point;
   detecting whether the second time point is later than the first time point to obtain the second determination result;
   obtaining a first update data amount with which the display interface updates the display content from the first time point to the second time point and determining whether the first update data amount is less than a preset display data amount on the display interface to obtain a fourth determination result, if the second determination result is YES; and
   displaying the first data on the display interface if the fourth determination result is YES.

7. The method according to claim 5, wherein the displaying the first data in the second display mode different from the first display mode if the first determination result is YES comprises:
   stopping update of the display content on the display interface if the first determination result is YES;
   detecting a second operation to display the first data on the display interface; and
   performing the second operation to display the first data on the display interface.

8. The method according to claim 7, further comprising, after the displaying the first data in the second display mode different from the first display mode:
   obtaining M content topics contained in all of the data displayed on the display interface within the time period and obtaining a starting position of respective data corresponding to each content topic in the M content topics; and
   splitting the display interface into a first display region and a second display region other than the first display region, wherein the first display region is configured for displaying the M content topics and the second display region is configured for displaying a first data corresponding to the first content topic when a third operation by the user on the first content topic in the M content topics is detected, the first data being included in all of the data.

9. The method according to claim 7, further comprising, after the displaying the first data in the second display mode different from the first display mode:
   obtaining a third data different from the first data; and
   splitting the display interface into a third display region for displaying the first data and a fourth display region for displaying the third data.

10. The method according to claim 1, further comprising, after the displaying the first data in the second display mode different from the first display mode:
    detecting a fourth operation and determining whether the fourth operation satisfies a second preset condition to obtain a fifth determination result; and
    displaying the data in the first display mode if the fifth determination result is YES.

11. An electronic apparatus having a display and capable of displaying data in a first display mode, wherein the electronic apparatus is further capable of, when obtaining a first data while operating in the first display mode, updating display content on a display interface of the display automatically with the first data, the electronic apparatus comprising:
    a first obtaining unit configured for obtaining the first data when the electronic apparatus is in the first display mode;
    a second obtaining unit configured for detecting a first operation and determining whether the first operation satisfies a first preset condition to obtain a first determination result, wherein the electronic apparatus is configured to display data in the first display mode responsive to a user's attention moving away from the display content;
    a third obtaining sub-unit configured for obtaining a first time point when the user stops viewing the display content on the display interface, and obtaining a second time point of detecting the user's attention moving back to the display content; and
    a first display configured for switching the electronic apparatus from the first display mode to a second display mode different from the first display mode responsive to the user's attention moving back to the display content after having moved away from the display content, including stopping updating the display content on the display interface automatically when the first update data amount is more than a preset display data amount on the display interface, wherein the first update data amount with which the display interface updates includes the display content from the first time point to the second time point.

12. The electronic apparatus according to claim 11, wherein the second obtaining unit comprises:
    a first determining sub-unit configured for determining whether the first data is local data stored in the electronic apparatus to obtain a second determination result, and/or a third determining sub-unit configured for determining whether the first data is interaction data generated from data interaction between the electronic apparatus and a second electronic apparatus other than the electronic apparatus to obtain a third determination result;
    a first obtaining sub-unit configured for detecting the first operation if the second determination result or the third determination result is YES; and
    a second determining sub-unit configured for determining whether the first operation satisfies the first preset condition to obtain the first determination result.

13. The electronic apparatus according to claim 12, wherein the determining whether the first operation satisfies the first preset condition to obtain the first determination result comprises:
    determining whether the first operation is a stop operation by the user to stop viewing the display content on the display interface to obtain the first determination result.

14. The electronic apparatus according to claim 13, wherein the first display is further configured for:
    displaying the first data on the display interface and stopping update of the display content on the display interface when the display interface is in an ON state if the first determination result is YES,
    wherein the electronic apparatus stops update of the display content on the display interface if the electronic apparatus is in the second display mode.

15. The electronic apparatus according to claim 12, wherein the determining whether the first operation satisfies the first preset condition to obtain the first determination result comprises:
    determining whether the first operation is a review operation by the user to review the display content on the display interface after the user has stopped viewing the display content for a time period to obtain the first determination result.

16. The electronic apparatus according to claim 15, wherein the first display comprises:
    a first processing sub-unit configured for stopping update of the display content on the display interface if the first determination result is YES;
    a third obtaining sub-unit configured for obtaining a time point when the user stops viewing the display content on the display interface as a first time point and obtaining a time point of detecting the first operation as a second time point, while the first processing sub-unit stops the update of the display content on the display interface;
    a fifth determining sub-unit configured for determining whether the second time point is later than the first time point to obtain the second determination result;
    a fourth obtaining sub-unit configured for obtaining a first update data amount with which the display interface updates the display content from the first time point to the second time point and determining whether the first update data amount is less than a preset display data amount on the display interface to obtain a fourth determination result, if the second determination result is YES; and a first sub-display configured for displaying the first data on the display interface if the fourth determination result is YES.

17. The electronic apparatus according to claim 15, wherein the first di splay comprises:
   a second processing sub-unit configured for stopping update of the display content on the display interface if the first determination result is YES;
   a fifth obtaining sub-unit configured for determining a second operation to display the first data on the display interface; and
   a second display sub-unit configured for performing the second operation to display the first data on the display interface.

18. The electronic apparatus according to claim 17, further comprising:
   a third obtaining unit configured for, after the displaying by the first display the first data in the second display mode different from the first display mode, obtaining M content topics contained in all of the data displayed on the display interface within the time period and obtaining a starting position of respective data corresponding to each content topic in the M content topics; and
   a first processing unit configured for splitting the display interface into a first display region and a second display region other than the first display region, wherein the first display region is configured for displaying the M content topics and the second display region is configured for displaying a first data corresponding to the first content topic when a third operation by the user on the first content topic in the M content topics is detected, the first data being included in all of the data.

19. The electronic apparatus according to claim 17, further comprising:
   a fourth obtaining unit configured for, after the displaying by the first display the first data in the second display mode different from the first display mode, obtaining a third data different from the first data; and
   a second processing unit configured for splitting the display interface into a third display region for displaying the first data and a fourth display region for displaying the third data.

20. The electronic apparatus according to claim 11, further comprising:
   a fifth obtaining unit configured for, after the displaying by the first display the first data in the second display mode different from the first display mode, detecting a fourth operation and determining whether the fourth operation satisfies a second preset condition to obtain a fifth determination result; and
   a second display configured for displaying the data in the first display mode if the fifth determination result is YES.

* * * * *